US009443345B2

United States Patent
Shim

(10) Patent No.: US 9,443,345 B2
(45) Date of Patent: *Sep. 13, 2016

(54) METHOD AND APPARATUS FOR RENDERING THREE-DIMENSIONAL (3D) OBJECT

(71) Applicant: Samsung Electronics Co., Ltd., Suwon-si (KR)

(72) Inventor: Hyun Jung Shim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

This patent is subject to a terminal disclaimer.

(21) Appl. No.: 14/322,126

(22) Filed: Jul. 2, 2014

(65) Prior Publication Data

US 2014/0313201 A1 Oct. 23, 2014

Related U.S. Application Data

(63) Continuation of application No. 12/926,373, filed on Nov. 12, 2010, now Pat. No. 8,792,708.

(30) Foreign Application Priority Data

Nov. 13, 2009 (KR) .................. 10-2009-0109733
Aug. 27, 2010 (KR) .................. 10-2010-0083561

(51) Int. Cl.
*G06T 15/00* (2011.01)
*G06T 15/06* (2011.01)
*G06T 15/50* (2011.01)

(52) U.S. Cl.
CPC .............. *G06T 15/06* (2013.01); *G06T 15/506* (2013.01); *G06T 2215/12* (2013.01)

(58) Field of Classification Search
CPC . G06T 7/0051; G06T 7/0053; G06T 7/0055; G06T 15/50; G06T 15/506; G06T 15/60; G06T 2215/16
See application file for complete search history.

(56) References Cited

U.S. PATENT DOCUMENTS 6,636,627 B1   10/2003   Oosawa ................. 382/154
8,094,964 B2   1/2012    Hadap et al. ........... 382/274
(Continued)

FOREIGN PATENT DOCUMENTS

JP   2002-236938 A   8/2002
JP   2004-234285 A   8/2004
(Continued)

OTHER PUBLICATIONS

U.S. Office Action mailed Jun. 24, 2013 in copending U.S. Appl. No. 12/926,373.
(Continued)

*Primary Examiner* — Andrew W Johns
(74) *Attorney, Agent, or Firm* — NSIP Law

(57) ABSTRACT

Provided is a method and apparatus that may generate a three-dimensional (3D) object from a two-dimensional (2D) image, and render the generated 3D object.
Light source information may be extracted from the 2D image using a characteristic of the 2D image, and property information associated with the 2D image may be extracted based on the light source information. In particular, specular information, scattering information, and the like may be stored in a database using a plurality of samples. Since pecular information or scattering information similar to an input image may be retrieved from the data base, property information may be quickly extracted.

20 Claims, 8 Drawing Sheets

(56) References Cited

U.S. PATENT DOCUMENTS

| | | | |
|---|---|---|---|
| 8,463,072 B2 | 6/2013 | Hadap et al. | 382/286 |
| 8,792,708 B2 * | 7/2014 | Shim | G06T 15/506 345/426 |
| 2006/0001673 A1 | 1/2006 | Brand | 345/582 |
| 2008/0279423 A1 | 11/2008 | Zhang et al. | 382/118 |
| 2009/0016214 A1 | 1/2009 | Alluisi et al. | 370/228 |
| 2009/0052748 A1 | 2/2009 | Jiang et al. | 382/118 |

FOREIGN PATENT DOCUMENTS

| | | |
|---|---|---|
| JP | 2005-293231 A | 10/2005 |
| JP | 2006-277748 A | 10/2006 |
| JP | 2007-299070 A | 11/2007 |
| JP | 2009-75880 A | 4/2009 |
| JP | 2009-211151 A | 9/2009 |
| KR | 10-2008-0111325 A | 12/2008 |

OTHER PUBLICATIONS

Debevec et al. (2000), "Acquiring the reflectance field of a human face", SIGGRAPH 2000, pp. 145-156.

Wang et al. (Jul. 2003), "Estimation of multiple directional light sources for synthesis of augmented reality images", Graphical Models, vol. 65, No. 4, pp. 185-205.

Chen et al. (2001), "Building 3-d human face models from two photographs", J. VLSI Signal Processing, vol. 27, pp. 127-140.

Wikipedia (Oct. 2009), "Mipmap".

Sloan et al. (2002), "Precomputed radiance transfer for real-time rendering in dynamic low-frequency lighting environments", SIGGRAPH 2002, pp. 527-536.

Pighin et al. (2002), "Modeling and animating realistic faces from images", Int'l Computer Vision, vol. 50, No. 2, pp. 143-169.

Borshukov et al. (2005), "Realistic human face rendering for The Matrix Reloaded", SIGGRAPH 2005 Courses, Article 13.

U.S. Office Action mailed Dec. 5, 2013 in copending U.S. Appl. No. 12/926,373.

U.S. Advisory Action mailed Feb. 10, 2014 in copending U.S. Appl. No. 12/926,373.

U.S. Notice of Panel Decision from Pre-Appeal Brief Review mailed Mar. 19, 2014 in copending U.S. Appl. No. 12/926,373.

U.S. Notice of Allowance mailed Mar. 25, 20143 in copending U.S. Appl. No. 12/926,373.

U.S. Appl. No. 12/926,373, filed Nov. 12, 2010, Hyun Jung Shim, Samsung Electronics Co., Ltd.

Korean Office Action issued on Apr. 25, 2016 in counterpart Korean Application No. 10-2010-0083561 (8 pages in Korea with a partial English translation).

* cited by examiner

METHOD AND APPARATUS FOR RENDERING THREE-DIMENSIONAL (3D) OBJECT

CROSS-REFERENCE TO RELATED APPLICATIONS

This application is a continuation application of U.S. patent application Ser. No. 12/926,373, filed Nov. 12, 2010, and is related to and claims the priority benefit of Korean Patent Application No. 10-2009-0109733, filed on Nov. 13, 2009 and Korean Patent Application No. 10-2010-0083561, filed on Aug. 27, 2010, in the Korean Intellectual Property Office, the disclosure of which is incorporated herein by reference.

BACKGROUND

1. Field

One or more embodiments relate to a technology of rendering a three-dimensional (3D) object.

2. Description of the Related Art

Recently, a demand on technologies of modeling and rendering a realistic human being, for example, an avatar creation technology has been receiving an increasing attention from various types of application fields such as a three-dimensional (3D) game, a 3D movie, a virtual reality, a web content creation, and the like. In particular, a technology of modeling and rendering a realistic facial skin tone of a human being may become an important factor to determine whether to realistically visualize a virtual character and thus researches on the above technology are ongoing in various angles.

Among researches for a skin texture extraction, various attempts have been made on a technology of extracting a facial texture from a single two-dimensional (2D) image and reproducing the extracted facial texture. However, a 2D texture is not enough to reproduce a realistic human being since the facial skin composes of multiple layers with various properties, which causes a complicated light transport. Due to the complicated illumination effects appearing on the skin, no specific solution to account for various skin properties has been proposed yet.

This is because it is difficult to separate various types of components from a single image. The image may be a result generated by combining an external factor, for example, light and an internal factor, for example, a characteristic of an object. When a number of combinations with respect to a pre-addition value is obtained from an added value, a large number of cases may exist. Accordingly, additional information may be utilized to find a desired answer among a large number of answers.

A disclosed method is generally concentrated on a scheme of extracting a facial property and the same algorithm employed by the disclosed method may be applicable to other class objects.

SUMMARY

According to an aspect of one or more embodiments, there may be provided a method of rendering a three-dimensional (3D) object, including extracting light source information of a two-dimensional (2D) image from the 2D image, extracting property information associated with the 2D image from a property information database based on the light source information, generating the 3D object from the 2D image, and rendering the 3D object based on the light source information and the property information.

According to another aspect of one or more embodiments, there may be provided an apparatus of rendering a 3D object, including a light source information extractor to extract light source information of a 2D image from the 2D image, a property information extractor to extract property information associated with the 2D image from a property information database based on the light source information, a 3D object generator to generate the 3D object from the 2D image, and a rendering unit to render the 3D object based on the light source information and the property information.

According to embodiments, it is possible to effectively extract a property component from a 2D image. In addition to extracting the property components, it is possible to increase or decrease the resolution of property information powered by a multi-resolution database of property information.

Also, according to embodiments, it is possible to effectively extract light source information of a 2D image from the 2D image.

According to another aspect of one or more embodiments, there may be provided at least one computer-readable recording medium storing computer readable instructions to implement methods of one or more embodiments.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION

Figure 1:
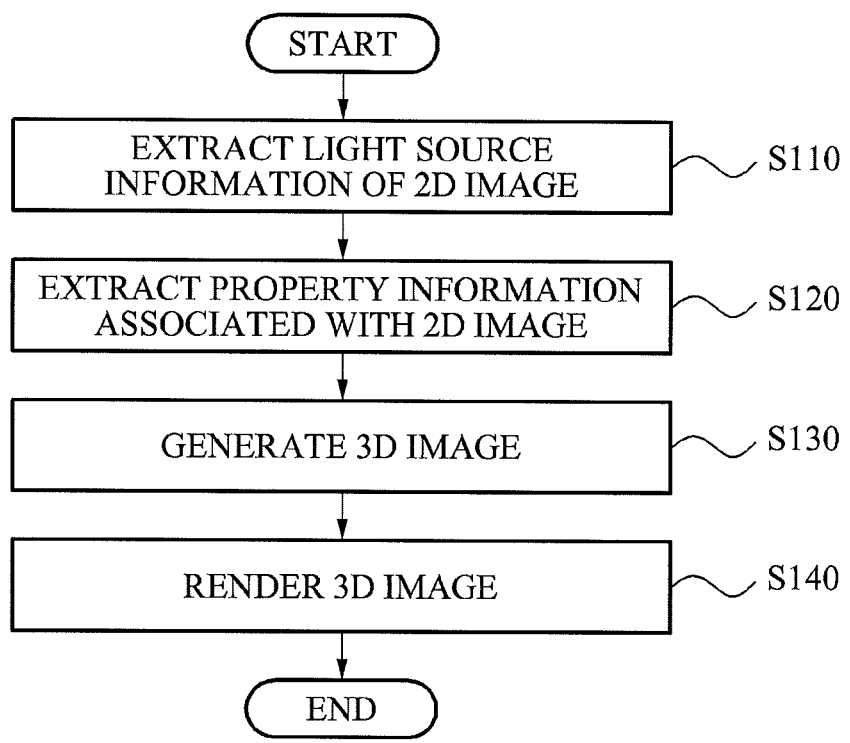
FIG. 1 illustrates a method of rendering a three-dimensional (3D) object according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

FIG. 1 illustrates a method of rendering a three-dimensional (3D) object according to an embodiment.

In operation S110, a 3D object rendering apparatus may extract light source information of a two-dimensional (2D) image from the 2D image. The light information denotes a factor decisively affecting an accuracy and a realistic effect of rendering. Accordingly, light source information of the 2D image may be accurately extracted for effective rendering.

Hereinafter, an example of extracting light source information will be further described with reference to FIGS. 2 through 3.

FIGS. 2A through 2D illustrate a scheme of extracting light source information according to an embodiment.

The 3D object rendering apparatus may estimate a direction of each of light sources with respect to each area of a 2D image. The 2D image may be a facial image obtained by photographing a face in a sunlight environment. In this example, a sunlight may correspond to a first light source with respect to the 2D image. However, when the sunlight is scattered from an object around the face, a second light source may be generated.

Accordingly, the 2D image may be considered to receive light from a plurality of light sources. A brightness of each area may be determined based on an amount of light received from the plurality of light sources. The sunlight may not be a main light source with respect to each area. For example, the sunlight may be a main light source with respect to an area around a forehead whereas a reflected light may be a main light source with respect to a jaw portion. In this case, the 3D object rendering apparatus may estimate, as a direction of a light source, a direction of the sunlight with respect to the area around the forehead, and may estimate, as the direction of the light source, a direction of the reflected light with respect to the jaw portion.

The 3D object rendering apparatus may estimate that each light source is located within a predetermined distance from the 3D object.

Figure 2A:
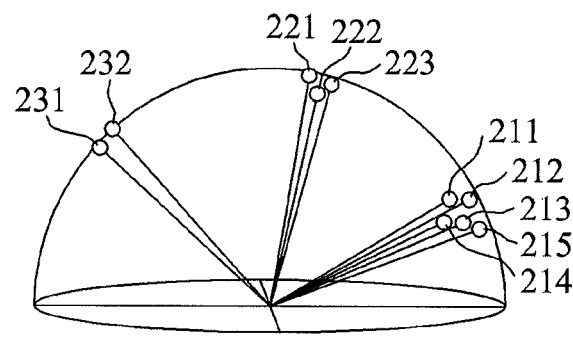
FIGS. 2A through 2D illustrate a scheme of extracting light source information according to an embodiment.

FIG. 2A illustrates a result of estimating light sources 211, 212, 213, 214, 215, 221, 222, 223, 231, and 232 located within a predetermined distance from the 3D object. When a first area and a second area are located in a similar location, a light source estimated with respect to the first area and a light source estimated with respect to the second area may be estimated to exist in a similar direction. Light sources existing in the similar direction may be grouped into the same group. In FIG. 2A, a first light source group may include the light sources 211, 212, 213, 214, and 215, a second light source group may include the light sources 221, 222, and 223, and a third light source group may include the light sources 231 and 232.

Figure 2B:
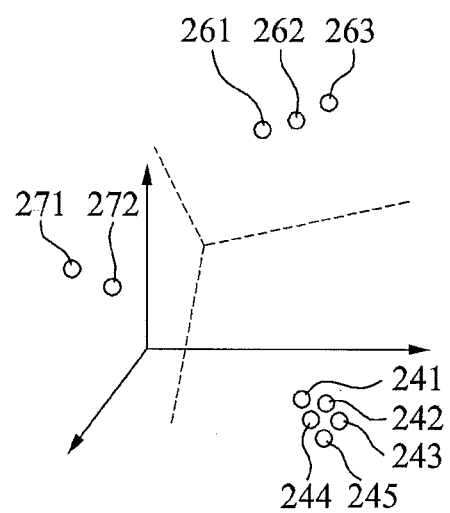

FIG. 2B illustrates directions of light sources, estimated in FIG. 2A, in a 3D space.

Light sources 241, 242, 243, 244, and 245 may correspond to the light sources 211, 212, 213, 214, and 215, respectively. Light sources 261, 262, and 263 may correspond to the light sources 221, 222, and 223, respectively. Light sources 271 and 272 may correspond to the light sources 231 and 232, respectively.

Figure 2C:
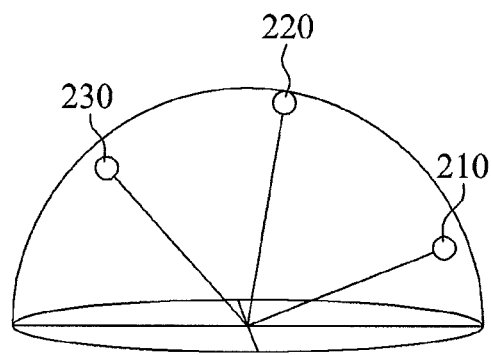

FIG. 2C illustrates a representative light source with respect to each light source group. When all of the light sources 211, 212, 213, 214, 215, 221, 222, 223, 231, and 232 are utilized with respect to the 3D object, a great amount of calculations may be utilized for rendering. Accordingly, the 3D object rendering apparatus may generate a single representative light source with respect to each light source group, for example, may generate representative light sources 210, 220, and 230 with respect to the first light source group, the second light source group, and the third light source group, respectively, and may render the 3D object based on only the representative light sources 210, 220, and 230. Through the above operation, the 3D object rendering apparatus may simply render the 3D object.

Figure 2D:
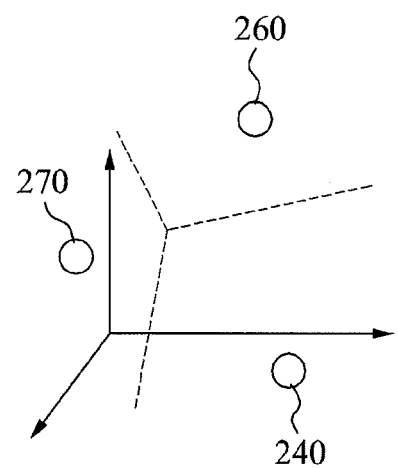

FIG. 2D illustrates directions of the representative light sources 210, 220, and 230, generated in FIG. 2C, in the 3D space. A representative light source 240 may correspond to the representative light source 210. A representative light source 260 may correspond to the representative light source 220. A representative light source 270 may correspond to the representative light source 230.

Figure 3:
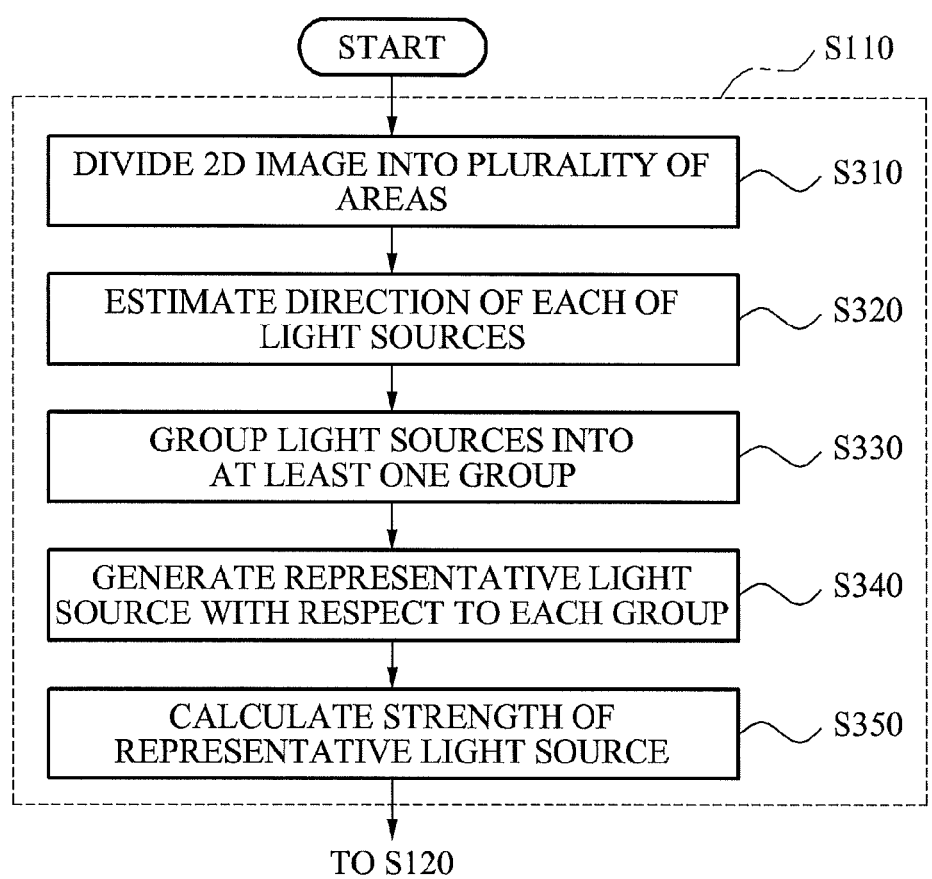
FIG. 3 illustrates a process of extracting light source information of FIG. 1.

FIG. 3 illustrates a detailed process of operation S110 of FIG. 1.

Operation S110 of FIG. 1 may include operations S310 through S350.

In operation S310, the 3D object rendering apparatus may divide a 2D image into a plurality of areas. The 3D object rendering apparatus may set a plurality of control points with respect to the 2D image based on a characteristic of the 2D image. The 3D object rendering apparatus may set, as a similar area with respect to each control point, an area having a similar characteristic in the 2D image. For example, the 3D object rendering apparatus may set, as the similar area, a patch provided around a corresponding control point. The 3D object rendering apparatus may set the similar area using a segment algorithm.

In operation S320, the 3D object rendering apparatus may estimate a direction of each of light sources with respect to each of the areas.

In operation S330, the 3D object rendering apparatus may group the light sources into at least one group. Each of the areas may receive light from the same light source, however, an estimated direction of a light source may be slightly different with respect to each area. The 3D object rendering apparatus may group, into a single group, light sources located in the similar direction.

In operation S340, the 3D object rendering apparatus may generate a single representative light source with respect to each of the at least one group. The 3D object rendering apparatus may average directions of light sources included in each of the at least one group, and set the average direction as the direction of the representative light source.

In operation S350, the 3D object rendering apparatus may calculate a strength of the representative light source. The 3D object rendering apparatus may calculate the strength of the representative light source to be in proportion to a number of light sources included in each of the at least one group.

Also, in operation S350, the 3D object rendering apparatus may extract, as light source information, a direction and the strength of the representative light source.

In operation S120, the 3D object rendering apparatus may extract property information associated with the 2D image. The 3D object rendering apparatus may extract the property information from a property information database. The property information may include at least one of texture information, specular information, and scattering information at various resolutions (e.g. This database includes the high/middle/low resolution property information).

Operation S120 of extracting the property information associated with the 2D image will be further described with reference to FIG. 4.

Figure 4:
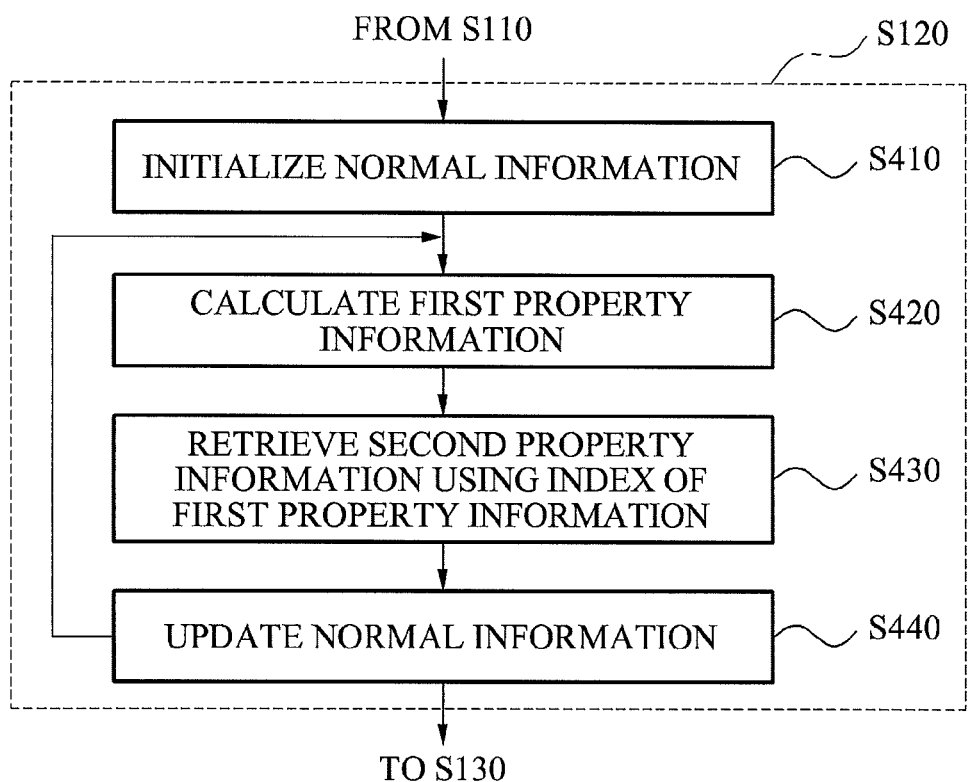
FIG. 4 illustrates a process of extracting property information of FIG. 1.

FIG. 4 illustrates a detailed process of operation S120 of FIG. 1.

In operation S410, the 3D object rendering apparatus may initialize normal information associated with the 3D object. The normal information denotes information obtained by differentiating a surface of the 3D object, and may be provided in a map form with respect to each area of the 3D object. When the 2D image corresponds to a facial image of a human being, the normal information may be initialized using a general facial shape of the human being.

In operation S420, the 3D object rendering apparatus may calculate first property information based on the normal information and light source information. The 3D object rendering apparatus may calculate the first property information according to the following Equation 1:

$$\min\|i-\rho \cdot n^T \cdot l\|^2 \qquad \text{[Equation 1]}$$

Here, i denote the 2D image, ρ denotes the first property information, n denotes a normal vector including the normal information, and denotes a light source vector including the light source information.

The 3D object rendering apparatus may calculate the first property information to minimize an error with the 3D object according to the above Equation 1. The first property information may be texture information.

In operation S430, the 3D object rendering apparatus may retrieve the property information from the property information database. The 3D object rendering apparatus may retrieve second property information based on the first property information. Also, it is possible to retrieve the property information under various resolutions from the multi-resolution property information database.

A plurality of property information under various resolutions may be associated with each other and thereby be stored in the property information database. For example, property information under various resolutions extracted from the same sample image may be stored in the property information database in association with the same index. In this case, since property information associated with the same index is extracted from the same sample image, the extracted property information may have a similar characteristic.

In operation S430, the 3D object rendering apparatus may retrieve second property information associated with the first property information using the index of the first property information. The first property information may be texture information associated with the 2D image, and the second property information may be specular information or scattering information.

The property information database may individually store a plurality of property information according to a plurality of resolutions. For example, the property information database may store a plurality of similar property information for rendering a 3D object, based on the plurality of resolutions.

As one example, in operation S430, the 3D object rendering apparatus may retrieve property information of a resolution corresponding to normal information from a plurality of similar property information having different resolutions, stored in the property information database.

As another example, in operation S430, the 3D object rendering apparatus may retrieve property information from the plurality of similar property information having different resolutions stored in the property information database, based on a resolution of the 2D image.

The property information calculated through operations S410 through S440 may be calculated based on the initialized normal information. Since the normal information is initialized using the general facial shape of the human being in operation S410, the normal information may be different from normal information associated with a face of the human being shown in the 2D image.

In operation S440, the 3D object rendering apparatus may update the normal information based on the property information.

The 3D object rendering apparatus may extract again and update the property information based on the updated normal information, and may update again the normal information based on the updated property information.

The 3D object rendering apparatus may update the normal information a predetermined number of times.

The 3D object rendering apparatus may repeatedly update the normal information and the property information until the error calculated using the above Equation 1 becomes to be less than or equal to a predetermined threshold.

In operation S450, the 3D object rendering apparatus may replace the property information retrieved in operation S430 with property information of a high resolution. The 3D object rendering apparatus may update the normal in operation in operation S440, and may replace the property information retrieved in operation S440 with property information of a high resolution corresponding to the updated normal information.

In operation S130, the 3D object rendering apparatus may generate the 3D object from the 2D image. The 3D object rendering apparatus may generate the 3D object by differentiating the normal information.

In operation S140, the 3D object rendering apparatus may render the 3D object. The 3D object rendering apparatus may render the 3D object based on the property information and the light source information extracted from the 2D image.

Figure 5:
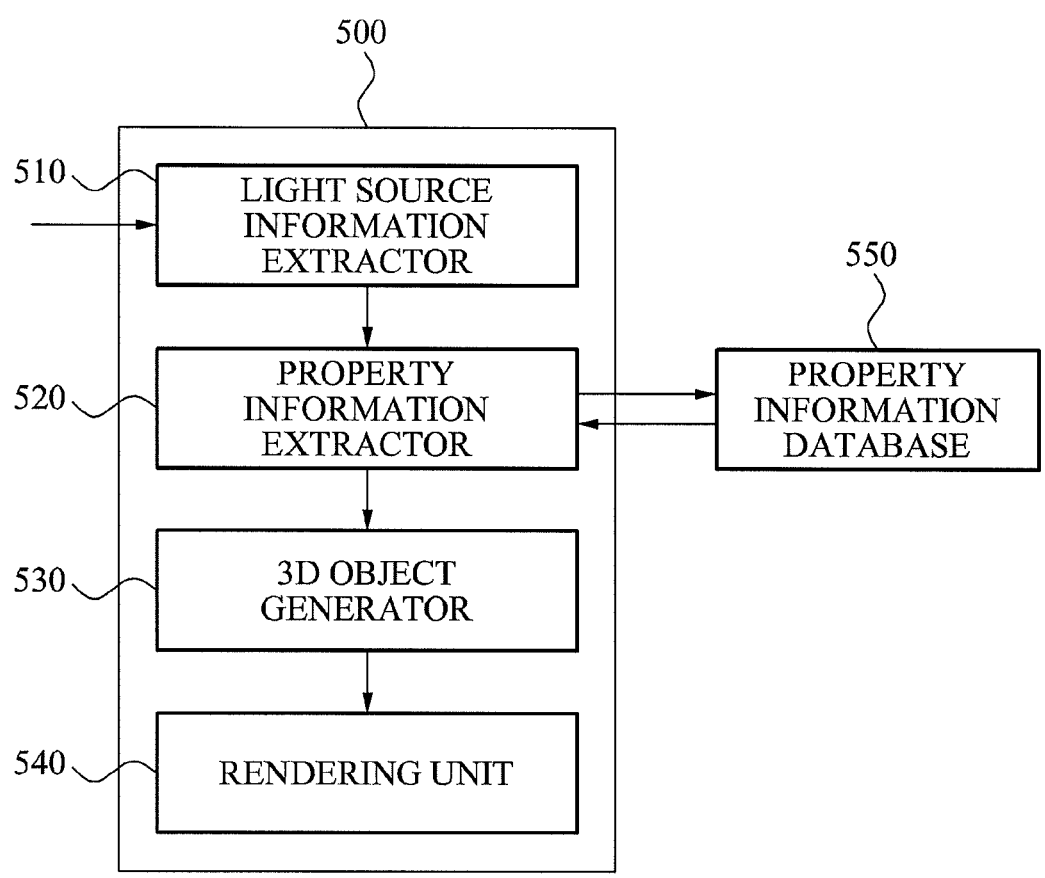
FIG. 5 illustrates a structure of a 3D object rendering apparatus according to an embodiment.

FIG. 5 illustrates a structure of a 3D object rendering apparatus 500 according to an embodiment.

The 3D object rendering apparatus 500 may include a light source information extractor 510, a property information extractor 520, a 3D object generator 530, and a rendering unit 540.

The light source information extractor 510 may extract light source information of a 2D image from the 2D image. Hereinafter, a configuration of the light source information extractor 510 will be further described with reference to FIG. 6.

Figure 6:
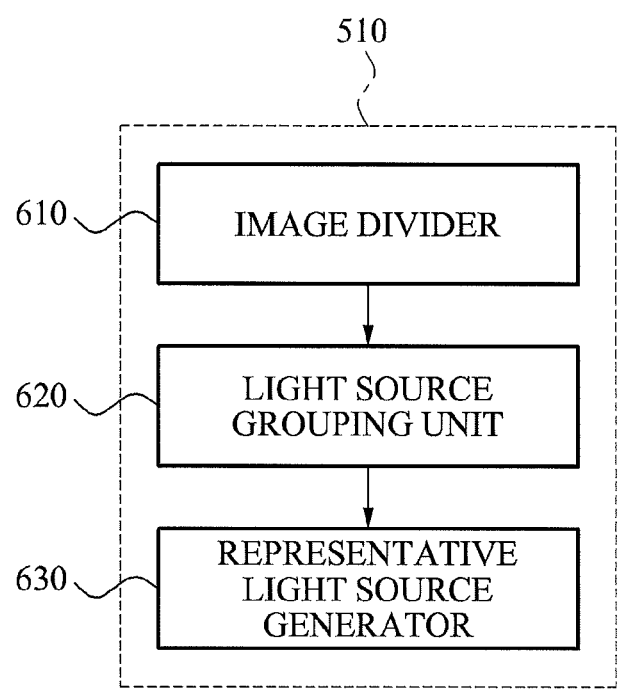
FIG. 6 illustrates a structure of a light source information extractor of FIG. 5.

FIG. 6 illustrates a structure of the light source information extractor 510 of FIG. 5. The light source information extractor 510 may include an image divider 610, a light source grouping unit 620, and a representative light source generator 630.

The image divider 610 may divide the 2D image into a plurality of areas. The image divider 610 may set a plurality of control points with respect to the 2D image. Here, the control points indicate characteristics of the 2D image. When the 2D image corresponds to a facial image of a human being, points indicating an eye portion, a lip portion, and the like may correspond to the control points. The image divider 610 may set, as a similar area with respect to each control point, an area having a similar characteristic in the 2D image.

The light source grouping unit 620 may estimate a direction of each of light sources with respect to each area, and group the light sources into at least one group. A direction of a light source may be slightly different with respect to each area. The light source grouping unit 620 may group, into a single group, light sources located in the similar direction.

The representative light source generator 630 may generate a representative light source with respect to each of the at least one group. When the 3D object is rendered based on only the representative light source, it is possible to further easily render the 3D object compared to rendering of the 3D object based on all the light sources.

The representative light source generator 630 may average directions of light sources included in each of the at least one group, and set the average direction as the direction of the representative light source. The representative light source generator 630 may calculate a strength of the representative light source to in proportion to a number of light sources included in each of the at least one group.

The representative light source generator 630 may extract, as light source information, a direction and the strength of the representative light source.

The property information extractor 520 may extract the property information from a property information database 550. The property information may include at least one of texture information, specular information, and scattering information.

Hereinafter, a configuration of the property information extractor 520 will be further described with reference to FIG. 7.

Figure 7:
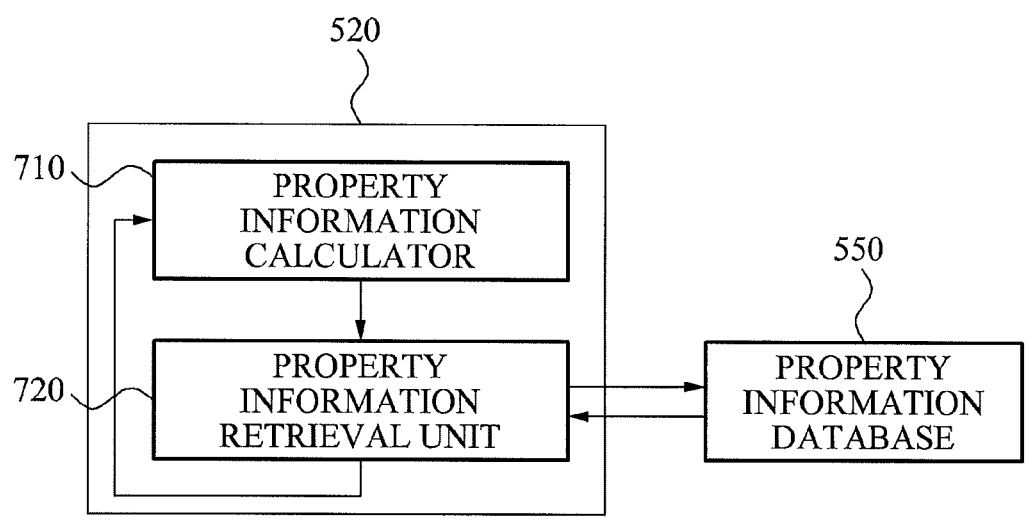
FIG. 7 illustrates a structure of a property information extractor of FIG. 5.

FIG. 7 illustrates a structure of the texture information extractor 520 of FIG. 5. The property information extractor 520 may include a property information calculator 710 and a property information retrieval unit 720.

The property information calculator 710 may initialize normal information associated with the 3D object. When the 2D image corresponds to a facial image of a human being, the normal information may be initialized using a general facial shape of the human being.

The property information calculator 710 may calculate first property information based on the initialized normal information and light source information. The property information calculator 710 may calculate the first property information according to the following Equation 2:

$$\min \|i - \rho \cdot n^T \cdot l\|^2 \quad \text{[Equation 2]}$$

Here, i denote the 2D image, $\rho$ denotes the first property information, n denotes a normal vector including the normal information, and denotes a light source vector including the light source information.

The property information calculator 710 may calculate the first property information to minimize an error with the 3D object according to the above Equation 2. The first property information may be texture information.

The property information retrieval unit 720 may retrieve the property information from the property information database 550.

A plurality of property information under various resolutions may be associated with each other and thereby be stored as a property information set. The property information included in the same property information set may have the same index. Specifically, the property information database 550 may store the property information, extracted from the same sample image, in association with the same index.

When the property information database 550 stores property information extracted from a large number of sample images, the property information retrieval unit 720 may easily retrieve a property information set containing the first property information similar to the 2D image.

For example, the property information calculator 710 may calculate texture information as the first property information. The property information retrieval unit 720 may retrieve, from the property information database 550, texture information most similar to the calculated texture information. The property information retrieval unit 720 may retrieve, as second property information, specular information or scattering information corresponding to an index of the retrieved texture information. An index of the retrieved specular information or scattering information may be the same as the index of the retrieved texture information.

Specifically, the property information database 550 may classify, into the same property information set, and store the retrieved texture information, specular information, scattering information, and information associated with a high/middle/low definition of each texture, specular, and scattering.

The property information database 550 may individually store a plurality of property information according to a plurality of resolutions. For example, the property information database 550 may store a plurality of similar property information for rendering a 3D object, based on the plurality of resolutions.

As one example, the property information retrieval unit 720 may retrieve property information of a resolution corresponding to initialized normal information from a plurality of property stored in the property information database 550.

As another example, the property information retrieval unit 720 may retrieve property information from the plurality of property information stored in the property information database 550, based on a resolution of the 2D image.

Since the normal information is initialized using the general facial shape of the human being, the normal information may be different from normal information associated with a face of the human being shown in the 2D image. The property information calculator 710 may update the normal information based on the retrieved property information.

The property information calculator 710 may update the normal information based on the retrieved property information, and the property information retrieval unit 720 may retrieve again the property information based on the updated normal information. Specifically, the property information retrieval unit 720 may replace the property information, retrieved based on the updated normal information, with property information of a high resolution corresponding to the updated normal information.

The property information calculator 710 and the property information retrieval unit 720 may repeatedly update the normal information and retrieve the property information until the error calculated using the above Equation 2 becomes to be less than or equal to a predetermined threshold.

The property information calculator 710 and the property information retrieval unit 720 may update the normal information and retrieve again the property information a predetermined number of times.

The 3D object generator 530 may generate the 3D object from the 2D image. The 3D object generator 530 may generate the 3D object by differentiating the normal information.

The rendering unit 540 may render the 3D object based on the light source information and the property information.

The 3D object rendering method according to the above-described embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a plurality of storage devices in a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few embodiments have been shown and described, it would be appreciated by those skilled in the art that changes may be made in these embodiments without departing from the principles and spirit of the disclosure, the scope of which is defined by the claims and their equivalents.

What is claimed is:

1. A method of rendering a three-dimensional (3D) object, comprising:
   extracting light source information from a single two dimensional (2D) image;
   extracting property information associated with the single 2D image from a property information database based on the light source information; and
   rendering the 3D object based on the light source information and the property information using at least one processor.

2. The method of claim 1, wherein the extracting property information comprises:
   extracting the property information associated with the single 2D image from the property information database based on the light source information and a 3D object shape associated with an object shape of the single 2D image.

3. The method of claim 1, wherein the 3D object shape corresponds to a generic 3D object shape.

4. The method of claim 3, wherein the single 2D image corresponds to a facial image, and wherein the generic 3D object corresponds to a general facial shape.

5. The method of claim 1, further comprising:
   generating the 3D object from the single 2D image.

6. The method of claim 1, wherein the extracting of the light source information comprises:
   dividing the single 2D image into a plurality of areas;
   estimating a direction of each of light sources with respect to each of the plurality of areas; and
   grouping the light sources into at least one group.

7. The method of claim 6, wherein the extracting of the light source information further comprises:
   generating a single representative light source with respect to each of the at least one group; and
   calculating a strength of the representative light source to extract, as the light source information, a direction and the strength of the representative light source.

8. The method of claim 1, wherein the extracting of the property information comprises:
   initializing normal information associated with the 3D object;
   retrieving the property information from the property information database based on the normal information and the light source information; and
   updating the normal information based on the retrieved property information.

9. The method of claim 8, wherein the retrieving of the property information comprises:
   calculating first property information based on the normal information and the light source information; and
   retrieving second property information associated with the first property information using an index of the first property information.

10. At least one non-transitory computer-readable recording medium storing computer readable instructions that control at least one processor to implement the method of claim 1.

11. An apparatus of rendering a 3D object, comprising:
    a processor; and
    a memory storing one or more programs, wherein the one or more programs are configured to be executed by the processor, the one or more programs including instructions for
    extracting light source information form a single 2D image;
    extracting property information associated with the single 2D image from a property information database based on the light source information; and
    rendering the 3D object based on the light source information and the property information.

12. The apparatus of claim 11, wherein the one or more programs further include instructions for:
    extracting the property information associated with the single 2D image from the property information database based on the light source information and a 3D object shape associated with an object shape of the single 2D image.

13. The apparatus of claim 11, wherein the 3D object shape corresponds to a generic 3D object shape.

14. The apparatus of claim 13, wherein the single 2D image corresponds to a facial image, and wherein the generic 3D object corresponds to a general facial shape.

15. The apparatus of claim 11, wherein the one or more programs further include instructions for:
    generating the 3D object from the single 2D image.

16. The apparatus of claim 11, wherein the one or more programs further include instructions for:
    dividing the single 2D image into a plurality of areas; and
    estimating a direction of each of light sources with respect to each of the plurality of areas, and grouping the light sources into at least one group.

17. The apparatus of claim 16, wherein the one or more programs further include instructions for generating a single representative light source with respect to each of the at least one group, and calculating a strength of the representative light source to extract, as the light source information, a direction and the strength of the representative light source.

18. The apparatus of claim 11, wherein the one or more programs further include instructions for:
    initializing normal information associated with the 3D object; and
    retrieving the property information from the property information database based on the normal information and the light source information, and
    updating the normal information based on the retrieved property information.

19. The apparatus of claim 18, wherein:
    a plurality of property information and high resolution property information is associated with each other and thereby is stored in the property information database, and
    wherein the one or more programs further include instructions for calculating first property information based on the normal information and the light source information, and retrieving second property information associated with the first property information and high resolution information of a first property and a second property using an index of the first property information.

20. The apparatus of claim 18, wherein the one or more programs further include instructions for increasing or decreasing a resolution of the retrieved property information using a high/middle/low resolution property database based on a resolution of the single 2D image.

\* \* \* \* \*